United States Patent
Sternberg et al.

(10) Patent No.: US 8,100,772 B2
(45) Date of Patent: Jan. 24, 2012

(54) JOYSTICK THUMB CUSHION

(75) Inventors: Aaron B. Sternberg, Vancouver, WA (US); Curtis James Harris, Darnestown, MD (US)

(73) Assignee: Ippasa, LLC, Vancouver, WA (US)

(*) Notice: Subject to any disclaimer, the term of this patent is extended or adjusted under 35 U.S.C. 154(b) by 437 days.

(21) Appl. No.: 12/305,739

(22) PCT Filed: Jun. 26, 2007

(86) PCT No.: PCT/US2007/072144
§ 371 (c)(1),
(2), (4) Date: Dec. 19, 2008

(87) PCT Pub. No.: WO2008/002926
PCT Pub. Date: Jan. 3, 2008

(65) Prior Publication Data
US 2010/0167825 A1    Jul. 1, 2010

Related U.S. Application Data

(60) Provisional application No. 60/816,711, filed on Jun. 26, 2006.

(51) Int. Cl.
*A63F 9/24* (2006.01)
(52) U.S. Cl. .......... 463/47; 400/491; 345/161
(58) Field of Classification Search .......... 463/47
See application file for complete search history.

(56) References Cited

U.S. PATENT DOCUMENTS

| | | | | |
|---|---|---|---|---|
| 1,340,617 A * | 5/1920 | Lynde | ............ | 135/83 |
| 1,687,736 A * | 10/1928 | Root | ............ | 473/560 |
| 5,813,777 A * | 9/1998 | Bonnstauffer | ............ | 400/491 |
| 6,102,802 A * | 8/2000 | Armstrong | ............ | 463/37 |
| 6,459,420 B1 * | 10/2002 | Harris | ............ | 345/161 |
| 7,167,159 B2 * | 1/2007 | Bailey | ............ | 345/161 |
| 2004/0056841 A1 * | 3/2004 | Slotta | ............ | 345/161 |

* cited by examiner

Primary Examiner — Melba Bumgarner
Assistant Examiner — Tramar Harper
(74) Attorney, Agent, or Firm — Stoel Rives LLP

(57) ABSTRACT

A cushioned attachment (30) for a user-manipulatable actuator (12) of a controller device (10) provides extra support and comfort for the user (60). A preferred embodiment is a joystick thumb cushion that fits over a conventional joystick actuator of a video game controller.

11 Claims, 2 Drawing Sheets

JOYSTICK THUMB CUSHION

RELATED APPLICATION

This application claims benefit of U.S. Provisional Patent Application No. 60/817,711, filed Jun. 26, 2006.

TECHNICAL FIELD

This invention relates to video game controller actuation devices and, more specifically, to a joystick or analog stick attachment that provides extra support and comfort for the game player.

BACKGROUND INFORMATION

Video games are a mainstream pastime and continue to grow in popularity. A popular, current standard method of playing console or personal computer video games is the use of an actuation device that includes multiple depressible buttons and one or more joysticks. The joystick device is similar in shape to that of a mushroom, in which a thin shaft portion extends upward from a base portion of the game actuation device and terminates in a top that is exponentially wider for suitable manipulation by a game player's thumb. A joystick of this type is the primary actuation device of the controller and is used to accomplish character/object/cursor movement for game progression. A video game player's success necessitates that there be sustained, comfortable contact between the video game player's thumb and the joystick. The thumb contact area of such a joystick is typically made in a shape and with material that lack the complete traction and comfort needed to sustain many hours of continual play without a game player developing thumb soreness or experiencing loss of control.

SUMMARY OF THE DISCLOSURE

It is, therefore, an object to provide to the cap or top of a joystick an air-cushioned attachment that provides extra thumb support and comfort to facilitate a video game player's thumb endurance and traction.

A cushioned attachment for a user-manipulatable actuator of a controller device provides extra support and comfort for the user. A preferred embodiment is a joystick thumb cushion that fits over a conventional joystick actuator of a video game controller. The joystick has an actuator top portion that is supported on a movable shaft and has top and side surfaces. The cushioned attachment has an elastomeric body that includes a hollow interior defined by a side surface connecting a closed top portion and a partly open bottom portion and a divider positioned in the interior body between the top and bottom portions. The partly open bottom portion extends radially inward from the side surface to define a bottom opening, and the divider extends radially inward from the side surface to form first and second interior cavities interconnected in fluid communication by a divider opening. The first interior cavity has a depth defined by a distance between the bottom portion and the divider, and the second interior cavity has a depth defined by a distance between the top portion and the divider. The bottom portion opening and the depth of the first interior cavity are sized to seat the actuator top portion in the first interior cavity upon placement of the cushioned attachment over the top and side surfaces of the actuator top portion. The divider opening and the depth of the second interior cavity are sized to provide for the user a sealed fluid cushion when the actuator top portion is seated.

Aspects and advantages of these technologies will be apparent from the following detailed description of a preferred embodiment, which proceeds with reference to the accompanying drawings.

DETAILED DESCRIPTION OF A PREFERRED EMBODIMENT

Figure 1A:
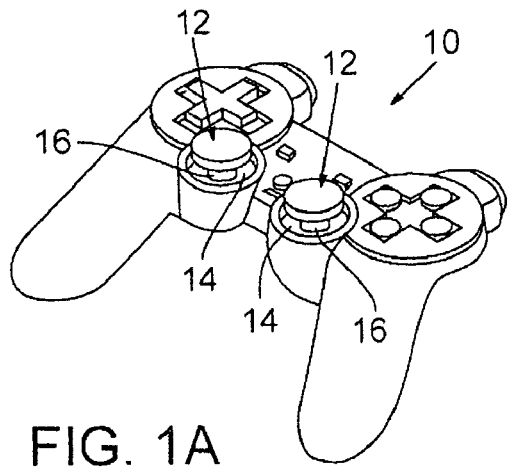
FIG. 1A is an isometric view of a conventional controller for a video game.
Figure 1B:
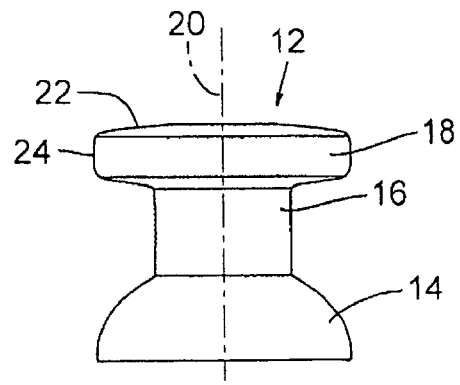
FIG. 1B is a side elevation view of a conventional mushroom-shaped joystick installed in the controller of FIG. 1A.

FIG. 1A shows a conventional video game controller 10 that is equipped with two separate joystick actuators or joysticks 12. FIG. 1B shows joystick 12, which is designed not only for installation in video game controller 10, but also for installation in most console and personal computer game actuation devices. Joystick 12 is of conventional shape, resembling that of a mushroom having a base portion 14, a shaft 16, and a rounded top portion 18, through all of which a central longitudinal axis 20 passes. Base portion 14 is mounted in a cup (not shown) in controller 10 to provide for joystick 12 a swivel joint that enables tilting of shaft 16 at all azimuthal angles about axis 20 in response to directional force imparted by a game player's thumb. Top portion 18 has a flat, circular top surface 22, the perimeter of which is finished with a rounded edge that merges with a downwardly depending circumferential side surface 24.

Figure 2:
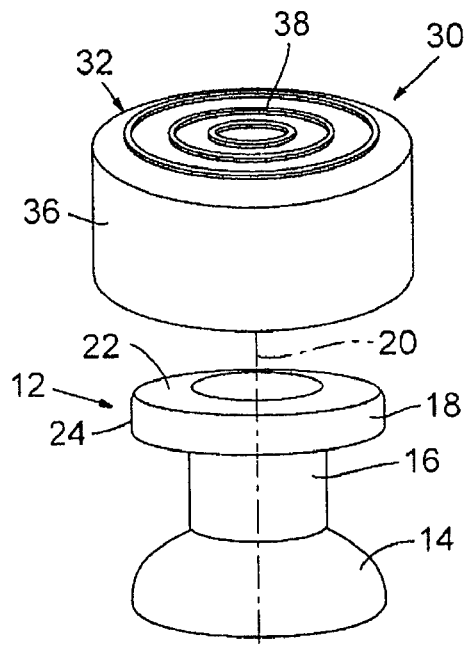
FIG. 2 is an isometric view of a preferred air-cushioned attachment shown positioned above the joystick of FIG. 1B.
Figure 3:
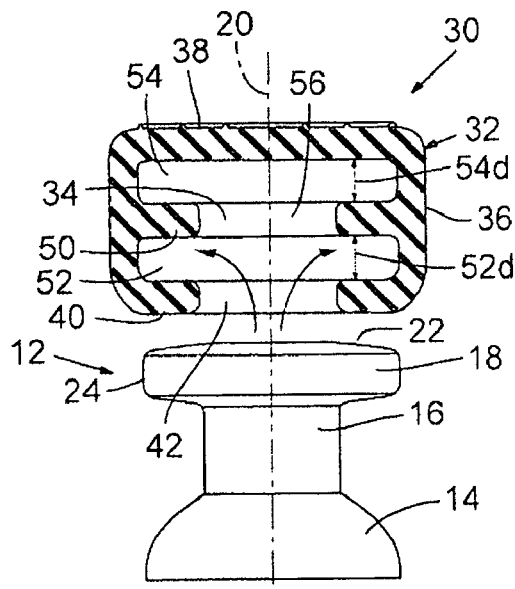
FIG. 3 is a side elevation view of the air-cushioned attachment of FIG. 2 shown in cross-section and positioned above the joystick of FIG. 1B.

FIGS. 2 and 3 show respective isometric and side elevation views of an embodiment of a joystick thumb cushion for or fluid-cushioned attachment 30 to joystick 12. In a preferred embodiment, fluid cushioning is provided by an air pocket, as is described below.

Cushioned attachment 30 includes a generally cylindrical body 32 made of elastomeric material, such as silicone. Body 32 has a hollow interior space 34 that is defined by a circumferential side surface 36 connecting a closed circular top portion 38 and a partly open bottom portion 40. Bottom portion 40 is in the form of an annular flange that extends radially inward from side surface 36 to form an opening 42 in the shape of a round hole.

A divider 50 positioned in interior space 34 of body 32 between top portion 38 and bottom portion 40 forms a first or lower interior cavity 52 and a second or upper interior cavity 54. Divider 50 is in the form of an annular flange that extends radially inward from side surface 36 to form an opening 56 in the shape of a round hole that interconnects and thereby provides a fluid communication passageway between interior cavity portions 52 and 54. Openings 42 and 56 are preferably of the same size for ease of manufacture.

Figure 4:
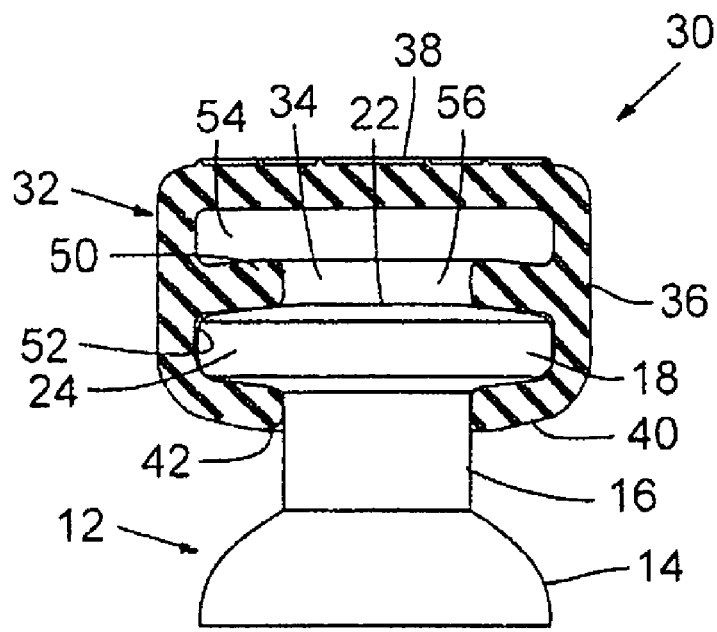
FIG. 4 is a side elevation view of the air-cushioned attachment of FIG. 2 shown in cross-section and fitted in place over the top and side surfaces of the top portion of the joystick of FIG. 1B.

Lower cavity 52 has a depth defined by a distance 52d between the bottom surface of divider 50 and the top surface of bottom portion 40. Distance 52d is set to snuggly seat rounded top portion 18 of joy stick 12 within lower cavity 52 when cushioned attachment 30 is fitted over top surface 22 and side surface 24, as shown in FIG. 4. Cushioned attachment 30 is preferably made of silicone so that it can readily stretch to fit over rounded top portion 18 of joystick 12 and then partly contract to maintain a tight fit against top surface 22 and side surface 24 of top portion 18. Skilled persons will appreciate there are available other elastomeric materials, such as rubber or latex, that exhibit the desired elasticity and afford comfortable traction for the game player's thumb.

Upper cavity 54 has a depth defined by distance 54d between the bottom surface of top portion 38 and the top surface of divider 50. Placement of top portion 18 of joystick 12 within lower cavity 52 develops within upper cavity 54 an air pocket that results from the seal created by top surface 22 of top portion 18 and divider 50, as shown in FIG. 4. Distance 54d is set to provide an air pocket of a size that results in a sealed air cushion that provides adequate support and comfort for the game player. In one embodiment, distance 54d is one-half of distance 52d.

Figure 5:
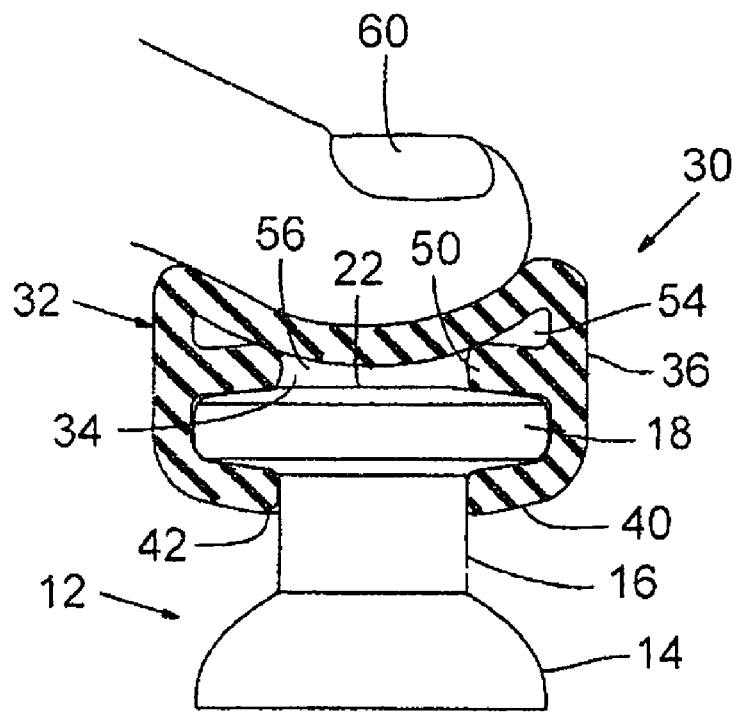
FIG. 5 shows a game player's thumb exerting substantial pressure on the air-cushioned attachment of FIG. 4 and thereby expelling most of the air from an air cushioning cavity in the interior of the air-cushioned attachment.

FIG. 5 shows top portion 18 of joystick 12 fitted within lower cavity 52 and upper cavity 54 remaining empty. A game player's thumb 60 exerts sufficient pressure against top portion 38 of cushioned attachment 30 to expel most of the air from upper cavity 54, through opening 56 of divider 50, into lower cavity 52, and outward through the interface between shaft 16 and bottom portion 40. Such pressure leaves upper cavity 54 in a collapsed, deflated state until cushioned attachment 30 is jarred or otherwise rearranged to break the seal formed by top portion 18 of joystick 12 and divider 50 and thereby permit readmission of air through lower cavity 52 and opening 56.

Cushioned attachment 30 is preferably a unitary article in which bottom portion 40 and divider 50 are integral parts. It is preferred that cushioned attachment 30 be embodied as a removable component.

It will be obvious to those having skill in the art that many changes may be made to the details of the above-described embodiment without departing from the underlying principles of the invention. The scope of the present invention should, therefore, be determined only by the following claims.

The invention claimed is:

1. A cushioned attachment for a user-manipulatable actuator of a controller device, the actuator having an actuator top portion supported on a movable shaft and having top and side surfaces, comprising:
    an elastomeric body including a hollow interior defined by a side surface connecting a closed top portion and a partly open bottom portion, the partly open bottom portion extending radially inward from the side surface to define a bottom portion opening;
    a divider including a flange positioned in the interior of the body between the closed top and partly open bottom portions and extending radially inward from the side surface, the divider having opposite first and second flange surfaces and forming first and second interior cavities separated by a divider opening that provides a fluid communication interconnection between them, the first interior cavity having a depth defined by a distance between the partly open bottom portion and the first flange surface of the divider, and the second interior cavity having a depth defined by a distance between the closed top portion and the second flange surface of the divider; and
    the bottom portion opening and the depth of the first interior cavity being sized to seat the actuator top portion in the first interior cavity upon placement of the cushioned attachment over the top and side surfaces of the actuator top portion, and the divider opening and the depth of the second interior cavity being sized to provide for the user a sealed fluid cushion when the actuator top portion is seated.

2. The cushioned attachment of claim 1, in which the sealed fluid cushion is a sealed air cushion.

3. The cushioned attachment of claim 1, in which the elastomeric body is a unitary article of which the partly open bottom portion and the divider are integral parts.

4. The cushioned attachment of claim 1, in which the partly open bottom portion is of annular shape and the bottom portion opening is a round hole.

5. The cushioned attachment of claim 1, in which the divider is of annular shape and the divider opening is a round hole.

6. The cushioned attachment of claim 1, in which the body is of generally cylindrical shape, and in which the partly open bottom portion and the divider are each of annular shape.

7. The cushioned attachment of claim 6, in which the elastomeric body is a unitary article of which the partly open bottom portion and the divider are integral parts.

8. The cushioned attachment of claim 1, in which the elastomeric body includes silicone material.

9. The cushioned attachment of claim 1, in which the elastomeric body includes one of rubber or latex material.

10. The cushioned attachment of claim 1, in which the bottom portion opening and the divider opening are of the same size.

11. The cushioned attachment of claim 1, in which the flange is of annular shape.

* * * * *